(12) United States Patent
Boyer et al.

(10) Patent No.: US 10,178,078 B1
(45) Date of Patent: *Jan. 8, 2019

(54) SECURE DIGITAL CREDENTIAL SHARING ARRANGEMENT

(71) Applicant: Assa Abloy AB, Stockholm (SE)

(72) Inventors: John Jules Alexander Boyer, Ontario (CA); Eric F. Le Saint, Los Altos, CA (US)

(73) Assignee: Assa Abloy AB, Stockholm (SE)

( * ) Notice: Subject to any disclaimer, the term of this patent is extended or adjusted under 35 U.S.C. 154(b) by 10 days.

This patent is subject to a terminal disclaimer.

(21) Appl. No.: 15/390,952

(22) Filed: Dec. 27, 2016

Related U.S. Application Data

(63) Continuation of application No. 13/910,243, filed on Jun. 5, 2013, now Pat. No. 9,563,757, which is a continuation of application No. 12/806,451, filed on Aug. 12, 2010, which is a continuation of application No. 11/397,710, filed on Apr. 5, 2006, now Pat. No. 7,802,293.

(60) Provisional application No. 60/668,595, filed on Apr. 6, 2005.

(51) Int. Cl.
*G06F 21/00* (2013.01)
*H04L 29/06* (2006.01)
*G06F 21/60* (2013.01)

(52) U.S. Cl.
CPC .......... *H04L 63/062* (2013.01); *G06F 21/602* (2013.01); *H04L 63/065* (2013.01)

(58) Field of Classification Search
CPC .................................................... H04L 63/062
See application file for complete search history.

(56) References Cited

U.S. PATENT DOCUMENTS

| | | | | |
|---|---|---|---|---|
| 5,661,806 A | * | 8/1997 | Nevoux | H04L 9/0844 380/247 |
| 6,141,760 A | * | 10/2000 | Abadi | G06F 21/46 713/184 |
| 6,732,277 B1 | * | 5/2004 | Vandergeest | H04L 63/0442 380/277 |
| 2003/0163686 A1 | * | 8/2003 | Ward | G06F 21/33 713/156 |
| 2004/0025026 A1 | * | 2/2004 | Karp | G06F 21/41 713/183 |
| 2005/0223414 A1 | * | 10/2005 | Kenrich | G06Q 20/3674 726/27 |

* cited by examiner

*Primary Examiner* — Alexander Lagor
*Assistant Examiner* — Syed M Ahsan
(74) *Attorney, Agent, or Firm* — Muirhead and Saturnelli, LLC

(57) ABSTRACT

A secure and transparent digital credential sharing arrangement which utilizes one or more cryptographic levels of indirection to obfuscate a sharing entity's credentials from those entities authorized to share the credentials. A security policy table is provided which allows the sharing entity to selectively authorize or revoke digital credential sharing among a plurality of entities. Various embodiments of the invention provide for secure storage and retrieval of digital credentials from security tokens such as smart cards. The secure sharing arrangement may be implemented in hierarchical or non-hierarchical embodiments as desired.

18 Claims, 8 Drawing Sheets

SECURE DIGITAL CREDENTIAL SHARING ARRANGEMENT

FIELD OF INVENTION

The present invention relates generally to a data processing method, and more specifically to a method, system and computer program product which allows a plurality of entities to securely share digital credentials.

BACKGROUND

In today's increasingly security conscious world, data is generally encoded using a variety of techniques to prevent unauthorized access to the underlying information. While encoding of data does improve security, the ability to securely share the information with another entity becomes more difficult as both the mechanism and encoding secret(s) must also be shared with each entity requiring access to the encoded data.

One approach is provided by Microsoft® Inc., in Windows® XP which allows an entity to specify at the file level, which registered entities may access the encoded information as part of operating system's encrypting file system. While effective for sharing large amounts of data with one or more entities in a one-to-many relationship, the mechanism does not support multiple entities sharing a common workspace who wish to selectively encode discrete files in a many-to-many relationship. That is, to allow multiple levels of encryption within the common workspace.

In addition, the Microsoft solution is limited to file sharing alone and does not address other circumstances which may require sharing of digital credentials. For example, network administrators frequently need to assist users or other entities in accessing selected services or networks where multiple credentials associated with the user or entity are implemented to access the various services or networks. In many cases, full disclosure of a user's credentials is unnecessary as only the problematic credentials need be made available to the network administrator.

Furthermore, the disclosure of even a partial portion of a user or entity's credentials is undesirable from a security perspective. As such, there is a need for a secure and selective credential sharing arrangement which is transparent and revocable by the sharing entity or user.

SUMMARY

This invention addresses the limitations described above and provides a mechanism for selectively and securely sharing user or entity credentials among a plurality of entities without automatically providing the sharing entities full access to all credentials or otherwise directly disclosing the shared credentials.

According to the invention, a method is provided which allows the secure and selective sharing of digital credentials among a plurality of separate entities, said method comprising:
   providing a first credential store having retrievably stored therein a plurality of first entity credentials,
   protecting at least a portion of said first entity credentials with first protection means configured to revocably allow said at least a portion of said first entity credentials to be revocably shared with at least a second entity, said first protection means comprising a first secret determinable by at least said second entity,
   generating said first secret as a function of at least
   i. a common secret between said first entity and said at least said second entity, and
   ii. a first entity specific string retrievable by said at least said second entity, and
   responsive to at least said first secret, granting said at least a second entity permission to share said at least a portion of said first entity credentials.

According to an aspect of the invention, said method comprises preferably one or several of the following features:
   portion of the first entity credentials using an algorithm which incorporates the first entity secret;
   The generation of said first secret comprises combining said first entity the first protective means further includes encoding at least a specific string with said common secret;
   the combining step includes at least one of a hash operation, a concatenation operation, an exclusive OR operation or a symmetric cryptographic operation
   the generation of said first secret comprises encrypting said common secret with said first entity specific string.

According to a particular embodiment of the the invention said method comprises:
   providing a second credential store having retrievably stored therein a plurality of second entity credentials,
   protecting at least a portion of said second entity credentials with second protection means configured to revocably allow said at least a portion of said second entity credentials to be revocably shared with said first entity, said second protection means comprising a second secret determinable by at least said first entity,
   generating said second secret as a function of at least said common secret, and
   responsive to at least said second secret, granting said at least a first entity permission to share said at least a portion of said second entity credentials.

According to other aspects of said particular embodiment of the invention, said method further comprises one or several of the following features:
   generating said second secret as a function of said common secret and of a second entity specific string retrievable by said first entity;
   said first secret and said second secret incorporate at least one level of indirection therebetween;
   said first secret and said second secret incorporate a hierarchical structure such that said first secret may be used to derive said second secret but not visa versa, and possibly protecting said second secret with said first secret;
   alternatively said first secret and said second secret incorporate a hierarchical structure such that said second secret may be used to derive said first secret but not visa versa, and possibly protecting said first secret with said second secret.

In still other aspects of the method according to the invention, said method further comprises one or several of the following features:
   the first entity specific string includes at least one of a user identifier, an IP address, a MAC address, a random string, an identification number assigned to a security token, a static password, a hash of a static password, a passphrase, a PIN, and a cryptogram generated by a symmetric or asymmetric key;
   on said second entity side, said common secret is stored encoded with said second secret.

The invention also provides a system to securely and selectively share digital credentials among a plurality of separate entities comprising:
- a first credential store having retrievably stored therein a plurality of first entity credentials,
- first protection means for protecting at least a portion of said first entity credentials, said first protection means comprising a first secret determinable by at least a second entity,
- first revocable means for revocably allowing said at least a portion of said first entity credentials to be shared with at least said second entity,
- first generating means for generating said first secret as a function of at least:
  i. a common secret between said first entity and said at least said second entity, and
  ii. a first entity specific string retrievable by said at least said second entity, and
- first granting means responsive to at least said first secret for granting said at least a second entity permission to share said at least a portion of said first entity credentials.

In one aspect of the invention, said system comprises preferably one or several of the following features:
- said first protection means further includes means for encoding said at least a portion of said first entity credentials using an algorithm which incorporates said first entity secret;
- said first generating means comprises means for combining said first entity specific string with said common secret; said means for combining may be means performing at least one of a hash operation, a concatenation operation, an exclusive OR operation or a symmetric cryptographic operation;
- the first generating means comprises means for encrypting said common secret with said first entity specific string.

According to a particular embodiment of the the invention said system comprises:
- a second credential store having retrievably stored therein a plurality of second entity credentials,
- second protection means for protecting at least a portion of said second entity credentials, said second protection means comprising a second secret determinable by at least said first entity,
- second revocable means for revocably allowing said at least a portion of said second entity credentials to be revocably shared with said first entity,
- second generating means for generating said second secret as a function of at least said common secret, and
- second granting means responsive to at least said second secret for granting said at least a first entity permission to share said at least a portion of said second entity credentials.

According to other aspects of said particular embodiment of the invention, said system further comprises one or several of the following features:
- said second generating means includes means for generating said second secret as a function of said common secret and of a second entity specific string retrievable by said first entity;
- said first secret and said second secret incorporate at least one level of indirection therebetween, and possibly said at least one level of indirection is derived from at least said common secret.
- said first secret and said second secret incorporate a hierarchical structure such that said first secret may be used to derive said second secret but not visa versa, and possibly said second secret is protected with said first secret;
- alternatively, said first secret and said second secret incorporate a hierarchical structure such that said second secret may be used to derive said first secret but not visa versa, and possibly said first secret is protected with said second secret.

In yet other aspects of the system according to the invention, said system further comprises one or several of the following features:
- the first revocable means includes a security policy means readable by said first revocable means and possibly said granting means includes editing means for editing said security policy means;
- said first credential store is operatively installed in at least one of a database associated with a server, a local client access directory, or a security token;
- the first entity specific string includes at least one of a user identifier, an IP address, a MAC address, a random string or an identification number assigned to a security token, a static password, a hash of a static password, a passphrase, a PIN, and a cryptogram generated by a symmetric or asymmetric key;
- said plurality of first entity credentials include at least one of a password, a security code, personal identification number, a digital certificate, a passphrase, a biometric template, or a cryptographic key.

The invention provides also a computer program product embodied in a tangible form comprising instructions for a processor to securely and selectively share credentials among a plurality of separate entities, said instructions executable by said processor to:
- access a first credential store having retrievably stored therein a plurality of first entity credentials,
- protect at least a portion of said first entity credentials with first protection means for revocably allowing said at least a portion of said first entity credentials to be shared with at least a second entity, said first protection means comprising a first secret determinable by at least said second entity,
- generate said first secret as a function of at least:
  a common secret between said first entity and said at least said second entity, and
  a first entity specific string retrievable by said at least said second entity, and
- responsive to at least said first secret, to grant said at least a second entity permission to share said at least a portion of said first entity credentials.

In one aspect of the computer program, said tangible form includes at least one of magnetic media, optical media or logical media.

In another aspect of the computer program, said executable instructions are stored in a code format comprising byte code, compiled, interpreted, compliable and interpretable.

The invention also provides a computer readable medium having stored thereon a data structure comprising:
- a first field containing data representing an entity specific data string;
- a second field containing encoded data representing a credential associated with the entity specific data string, and
- a third field containing data representing a entity specific secret used in encoding at least the second field.

In one aspect of the computer readable medium according to the invention, a forth field is provided which contains data representing a common secret from which the entity specific secret is derived in conjunction with the first field.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. Optional components are generally shown in dashed lines. It is intended that changes and modifications can be made to the described embodiment without departing from the true scope and spirit of the subject invention as defined in the claims.

DETAILED DESCRIPTION

The present invention provides a mechanism to securely share entity credentials among a plurality of separate entities. The secure sharing mechanism is based on cryptographic indirection techniques and is intended to supplement the standardized security features normally provided by the various operating systems currently available. Where necessary, applications used to implement the various embodiments of the invention are envisioned to be programmed in a high level language such as Java™, C++, and C, C # or Visual Basic™.

Figure 1:
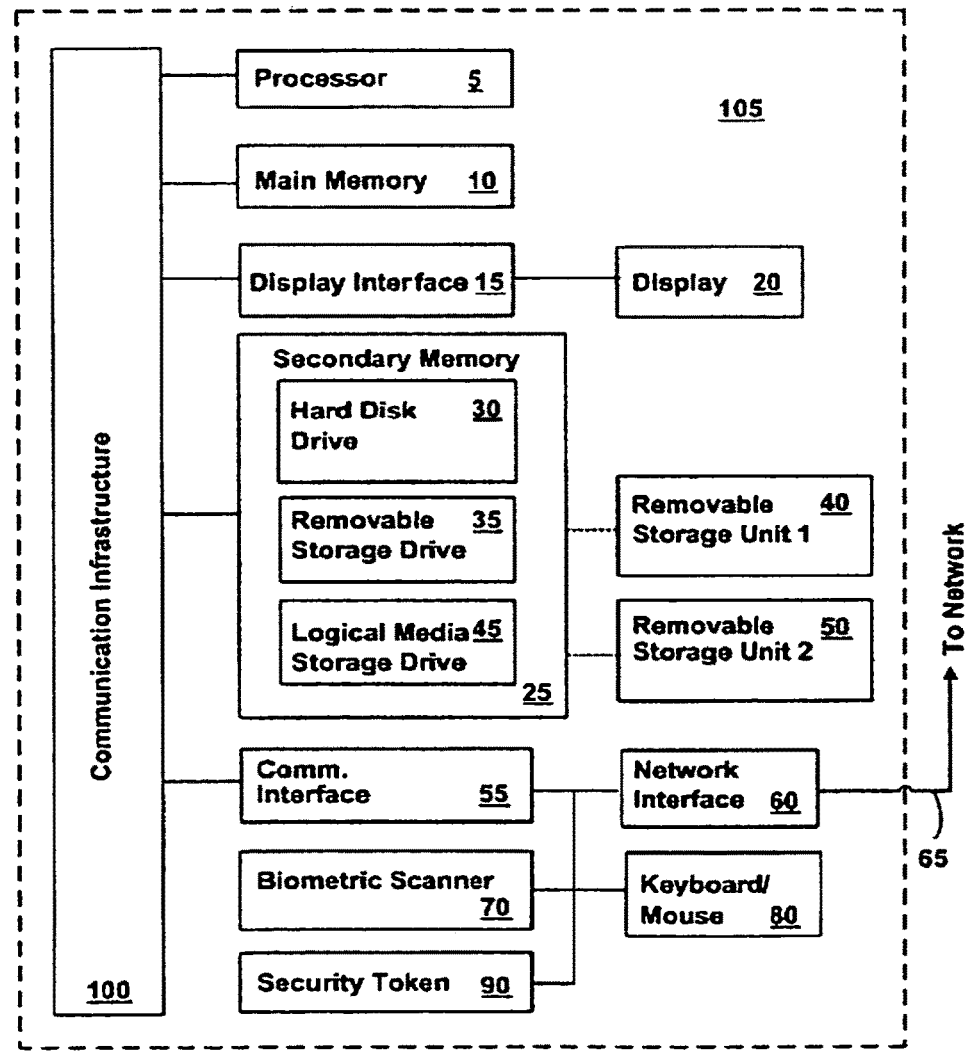
FIG. 1—is a generalized block diagram of a computer system and associated peripheral devices including a functionally connected security token and biometric scanner.

Referring to FIG. 1, a functional block diagram of a computer system 105 and associated peripherals is depicted. In a networking environment, the depicted computer system 105 is intended to apply to both client and server arrangements.

The term credential as referred to herein includes authentication data, related attributes, digital certificates, passwords, personal identification numbers (PIN), biometric samples, asymmetric and symmetric cryptographic keys, and other information used to establish an entity's access rights and/or access permissions.

The computer system 105 includes a processor 5, a main memory 10, a visual display 20 electrically coupled to a display interface 15, a secondary memory subsystem 25 electrically coupled to a hard disk drive 30, a removable storage drive 35 electrically coupled to a removable storage unit 40 and an auxiliary removable storage interface 45 electrically coupled to an logical media storage unit 50. The display device 20 may include a touch sensitive screen. The removable storage units 45, 50 are intended to include flash memory devices such as USB based solid state hard drives and related logical media drives.

A communications interface 55 subsystem is coupled to a network 65 via a network interface 60. The network 65 includes traditional wired, optical or wireless networks which may incorporate a secure communications protocol such as secure socket layer (SSL), transport layer security (TLS), private communications technology (PCT) or internet protocol security (IPsec.)

A security token 90 is operably coupled to the communications interface 55. The term security token 90 as described herein includes hardware based security devices such as cryptographic modules, smart cards, integrated circuit chip cards, portable data carriers (PDC), personal security devices (PSD), subscriber identification modules (SIM), wireless identification modules (WIM), USB token dongles, identification tokens, secure application modules (SAM), hardware security modules (HSM), secure multimedia token (SMMC), trusted platform computing alliance chips (TPCA) and like devices.

The security token 90 may be directly coupled to the computer system 105 or remotely coupled to the computer system 105 via another networked computer system. The security token. 90 includes a wireless, optical and/or electrical connection means compatible with the communications interface 55, a microprocessor, a cryptography co-processor, volatile and non-volatile memory electrically coupled to the processor and co-processor, a runtime operating environment.

The security token 90 further comprises cryptography extensions available to the runtime environment and capable of performing symmetric and asymmetric cryptographic functions compatible with the computer system's and/or an authentication server's cryptography software.

The security token 90 further comprises in an embodiment of the invention one or more credentials. One or more security applications are provided to allow implementation of the embodiment of the invention which utilizes the security token. In another embodiment of the invention, the security token further includes one or more security policies which allow an entity to securely share one or more of the credentials stored therein.

User input devices such as a mouse and a keyboard 20 are operatively coupled to the communications interface 55. Lastly, a biometric scanner 70 may optionally be coupled to the communications interface 55. The biometric scanner 70 is used capture biometric samples from one or more entities which become stored in a credential store.

The processor 5, main memory 10, display interface 15, secondary memory subsystem 25 and communications interface system 55 are electrically coupled to a communications infrastructure 100, commonly referred to as I/O bus or system bus. The computer system 105 includes an operating system, one or more security applications, a security token application programming interface where necessary, one or more security token aware applications, cryptography software capable of performing symmetric and asymmetric cryptographic functions compatible with that of the security token 90 and/or an authentication server, at least one graphical display application suitable for displaying the security information received from the security token 90 and all necessary device interface and driver software.

Figure 2:
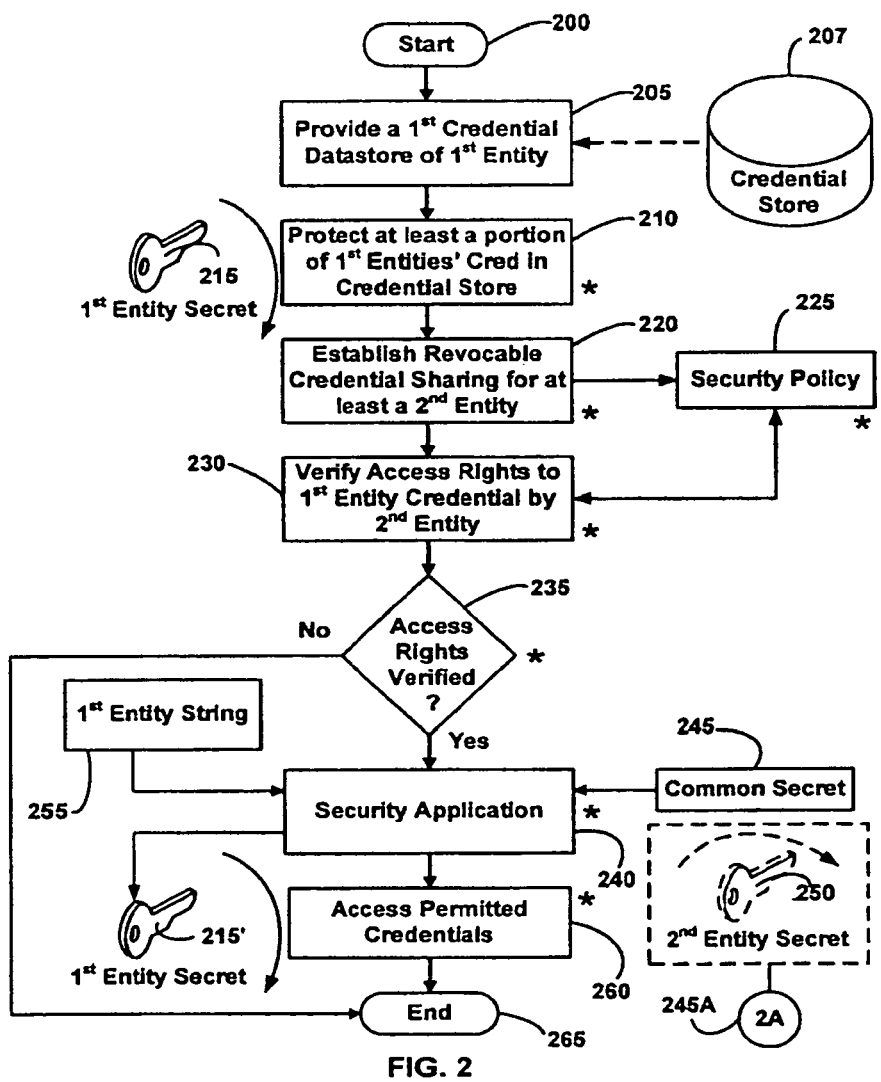
FIG. 2—is a flow chart depicting an embodiment of the invention where the digital credentials of a first entity are shared with a second entity.

Referring to FIG. 2, a flow chart is provided which illustrates the major process interactions used to implement the various embodiments of the invention. The processes are initiated 200 by providing a first credential store 207 associated with a first entity 205. At least a portion of the first entity's credentials maintained in the credential store 207 are then revocably protected 210 using a secret 215 belonging to the first entity. The first entity secret 215 is depicted as a key for example only. One skilled in the art will appreciate that other types of static secrets will work as well. The original first entity's secret 215 is generally stored in the first entity's credential data store 207 along with a copy of a common secret 245.

Once the first entity's credentials have been protected, revocable credential rights for each separate entity authorized to share the first entity's credentials are defined 220 by establishing the revocable credential rights in a security policy 225.

The security policy 225 comprises a security table which allows an entity to authorize or revoke credential sharing privileges among a plurality of entities. The security policy 225 may further include other sharing criteria including sharing expiration dates, logical usage rules, location usage rules, priority usage rules, time usage rules or security state based rules.

A second entity is used as an example of a separate entity intending to share the first entity's credentials. Additional sharing entities may be established in the security policy 225 as well. The security policy 225 may be incorporated into an access rights table for multiple session usage or maintained in volatile memory to limit the sharing of the first entity's credentials to a single session.

In order for the second entity to share the first entity's credentials, a verification process is provided 230. The verification process examines the security policy 225 to determine if the second entity has been granted revocable credential rights.

If the second entity has not been granted revocable credential rights, access is denied 235, followed by process termination 265. If the second entity has been granted revocable credential rights 235, a security application 240 retrieves a publicly available data string unique to the first entity 255 along with the common secret 245. Each entity which is authorized to share the first entity's credentials is provided a copy of the common secret or the means to regenerate the common secret 245.

Figure 4:
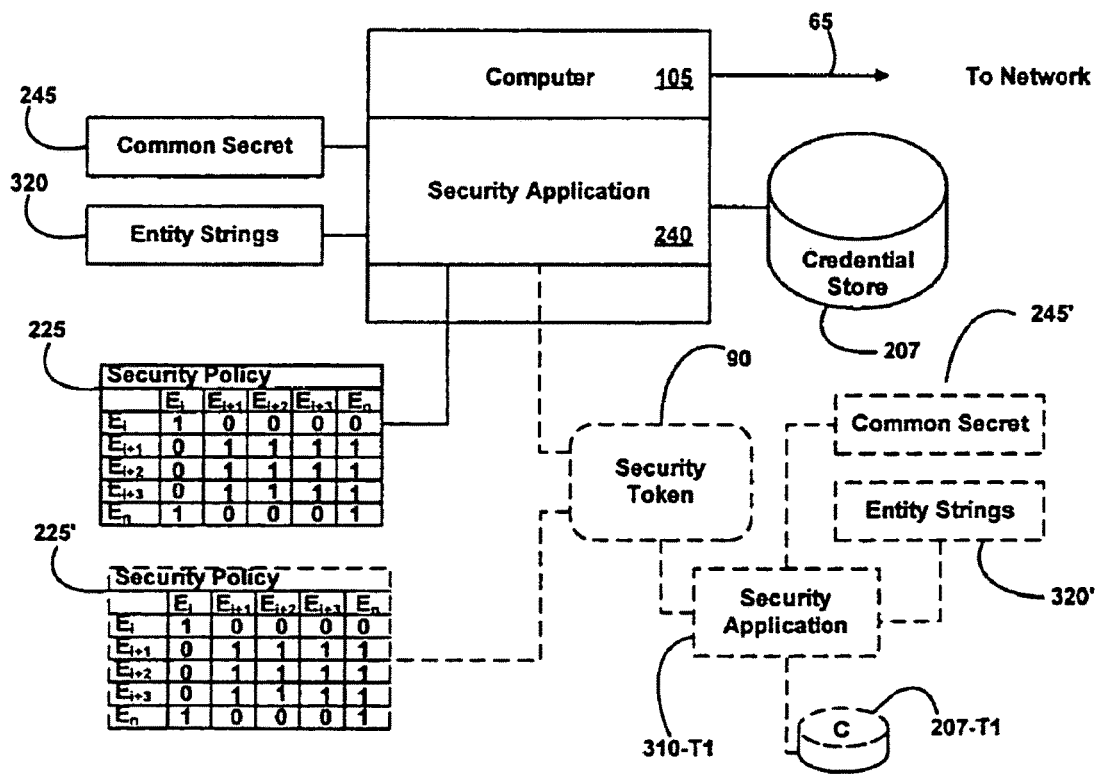
FIG. 4—is a detailed block diagram of a network capable computer system that is configured to implement an embodiment of the invention.
Figure 4A:
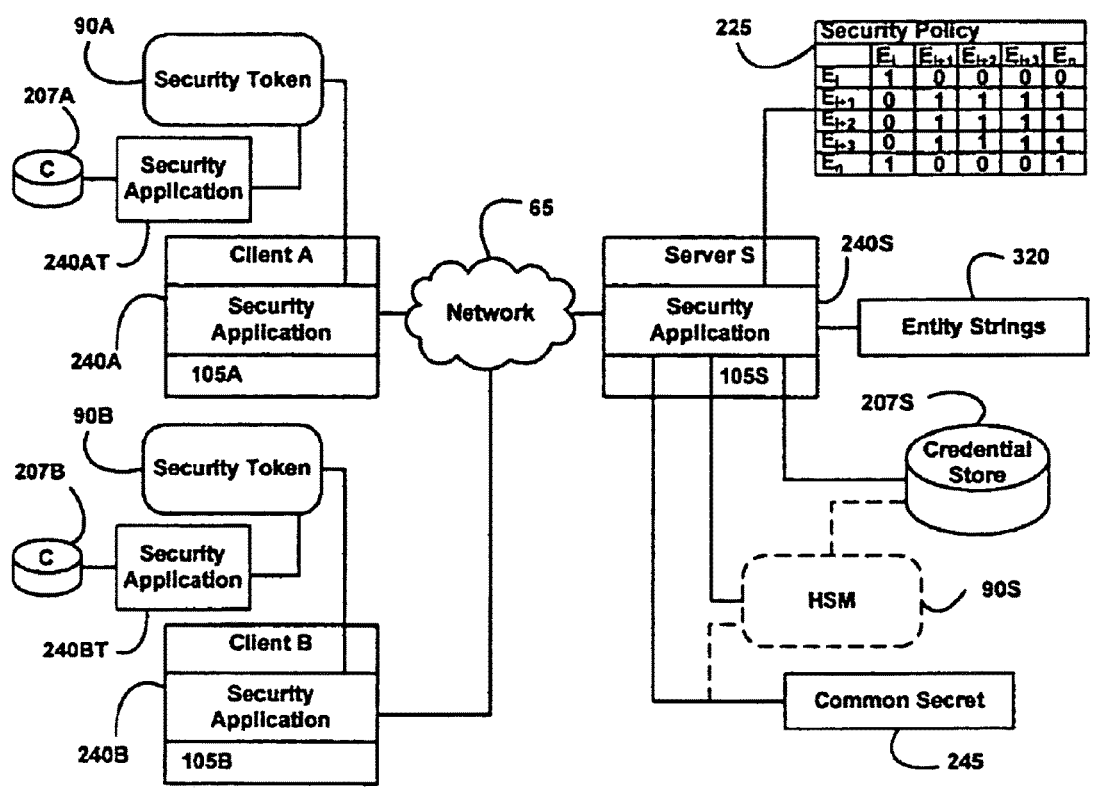
FIG. 4A—is a detailed block diagram of a plurality of network capable computer systems that are configured to implement an embodiment of the invention in an enterprise operating environment.

The common secret 245 is normally stored in each sharing entity's credential data store 207 or securely provided from a central datastore (FIG. 4A.) An alternate embodiment of the invention which affords greater protection of the common secret 245 is described in FIG. 2A.

The first entity string 255 and the common secret 245 are then algorithmically combined to regenerate the first entity's secret 215'. The security application 240 then facilitates access to the first entity's credentials by the authorized second entity 260. The specific security mechanism employed by the security application 240 may be cryptography based, or performed as a gatekeeper function. In both instances, the first entity's regenerated secret 215' is incorporated into the security mechanism. Once the second entity has completed sharing of the first entity's credentials, processing ends 265.

In one embodiment of invention, the regenerated first entity's secret 215' is stored in a credential data store belonging to the second entity. In another embodiment of invention, the regenerated first entity's secret 215' is maintained in volatile memory only for the duration of its use and is destroyed upon processing termination 265.

In various embodiments of the invention, the credential protection, security policy and second entity verification designated with an asterisks (*) are performed by either the same security application 240 or in conjunction with other security applications 240'.

Figure 2A:
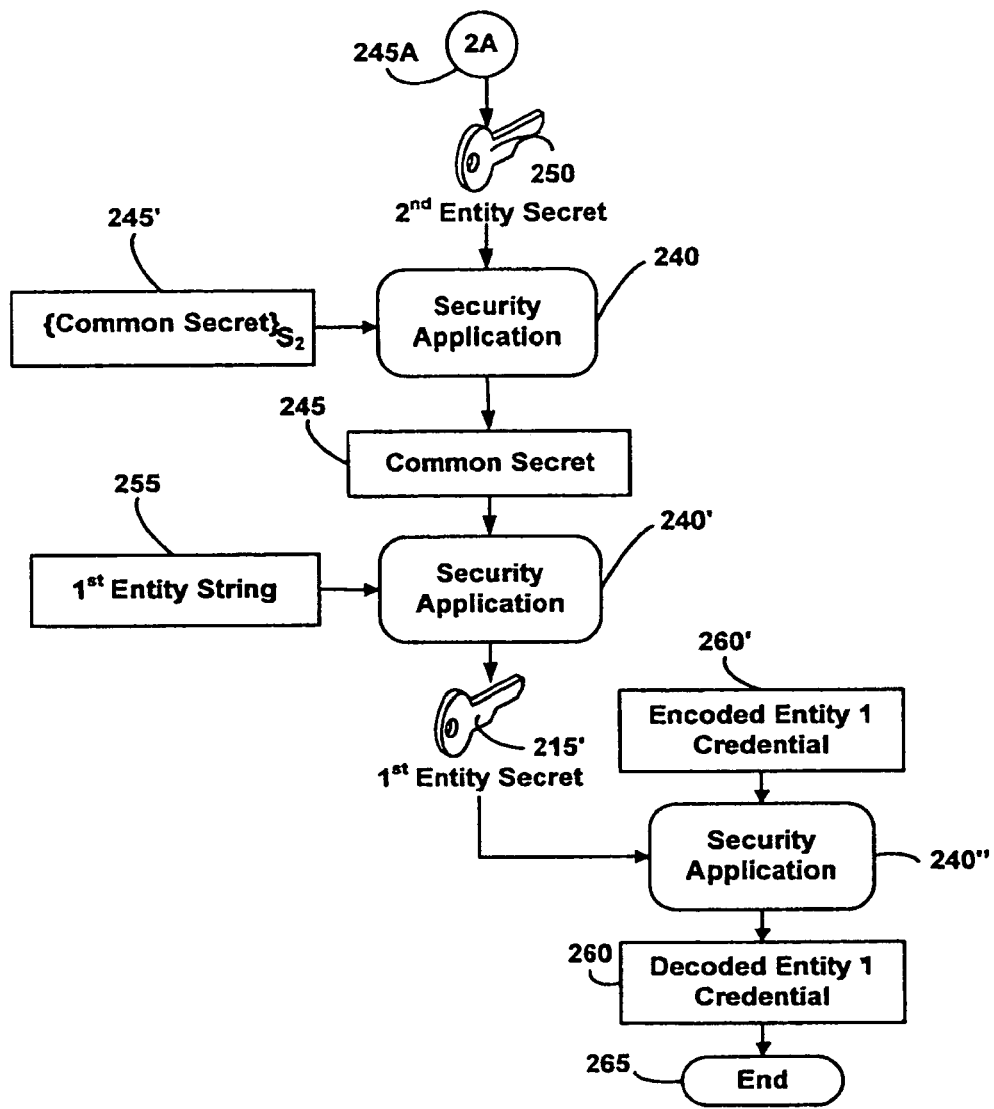
FIG. 2A—is another flow chart depicting an encoding and decoding mechanism associated with an embodiment of the invention.

Referring to FIG. 2A, an alternate embodiment of invention is shown which affords greater protection of the common secret 245. In this embodiment of invention, the second entity's copy of the common secret 245 is encoded with the second entity's own secret 250. In order to use the common secret 245 for generating the first entity's entities secret 215', the encoded common secret 245' is decoded by combining algorithmically the second entity's secret 250 with the encoded common secret 245' using the security application 240'. The first entity string 255 and the common secret 245 are then algorithmically combined to regenerate the first entity's secret 215'

The resulting first entity's secret 215' is then used to decode one or more of the encoded first entity credentials 260' using the security application 240'', freeing the decoded first entity credential(s) for use 260 by the second entity. Processing ends 265 after the second entity has completed using the first entity's decoded credentials.

In an embodiment of the invention, the entity secrets 215, 250 are generated on demand rather than being stored with each entity's credentials. This arrangement is somewhat more secure by limiting the number of stored secrets available for interception. However, reconstruction of one or more of the entity secrets may reduce overall system performance.

Figure 3:
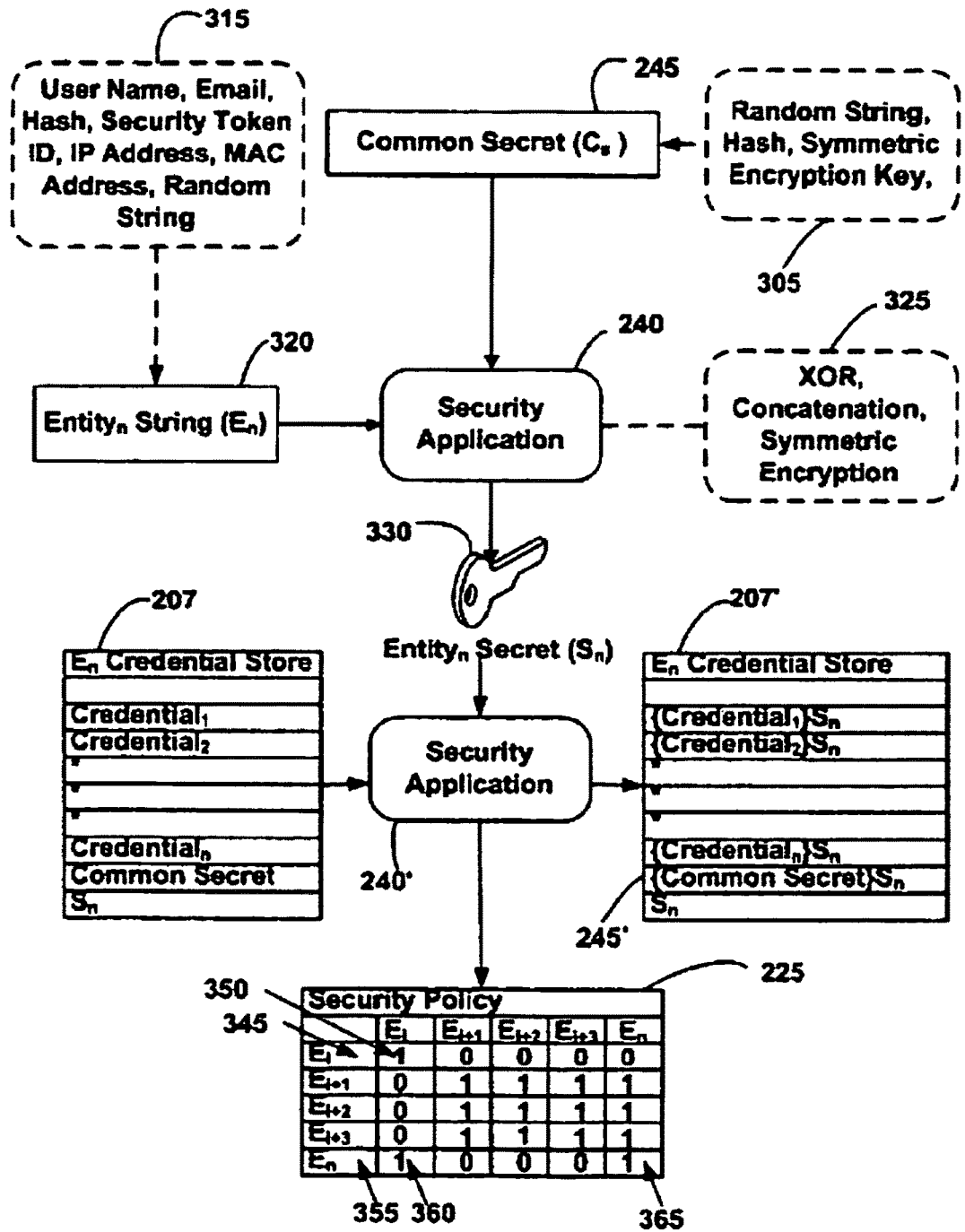
FIG. 3—is another flow chart depicting the generation of security parameters and data encoding implemented in an embodiment of the invention.

Referring to FIG. 3, a detailed block diagram is provided which describes the interactions of the common secret 245, security policy 225 and the entity secret 330. The common secret 245 denoted as $C_s$ may be generated from a random string, a random number, a hash of an existing secret, or simply utilizing an existing symmetric key 305. The common secret $C_s$ 245 provides a level of indirection which allows the second entity to derive a specific secret of the first entity secret used to encode a portion of the first entity's credentials.

When a suitable source for the entity string data 320 and common secret $C_s$ 245 has been generated or derived, each entity's secret 330 may be generated by algorithmically combining each entity's unique string data 320 $E_n$ with the common secret 245 using the security application 240.

Once each entities unique secret 330 has been generated, it is then stored along with a copy of the common secret 245 in a credential data store 207 unique to each entity.

Another security application 240' compatible with the security application 240 which generated the entity secret 330 is used to update a security policy 225 with the proposed credential sharing arrangement between entities.

For example, entity $E_i$ 345 is only allowed to access its own credentials as designed by the "1" 350 and "0's" elsewhere in the array holding the revocable credential rights. In furtherance of this example, entity $E_n$ is permitted to use its own credentials 365 and also may share the credentials of entity $E_i$. Lastly, it is also envisioned by the inventors to include an additional security provision which prevents an entity from using its own credentials in the event of a security compromise.

In another embodiment of the invention, each entity's credential data store 207 or portions thereof are encoded using the security application 240' and each entity's secret 330. The results of the encoding process are stored in each entity's credential data store 207' along with an encoded copy of the common secret 245' and an unencoded copy of the entity's specific secret 330. Security protection of each entity's secret 330 is provided by the normal operating system security policies.

The common secret 245 is derived from a function having the general form of;

$$C_s = f(Ms)$$

Where $C_s$ is derived from a master secret Ms;

Ms may be generated from a random string, a random number, a hash of a random string or number, a symmetric encryption key or any combination thereof.

The function f is generally a symmetric cryptographic algorithm such as DES, 3DES, AES. However, other common operations such as an exclusive OR operation or a concatenation operation and may be substituted for or used in conjunction with the symmetric cryptographic algorithm.

In one embodiment of the invention, the entity specific secret 330 denoted as $S_n$ is derived from a function f generally having the form of;

$$S_n = f(C_s, E_n)$$

where $S_n$ is derived from the common secret $C_s$ and an entity specific string $E_n$ unique to a credential holding entity (Entity$_n$).

The entity specific string $E_n$ 320 is derived from existing non-secret information such as a username, email address, security token identifier, network address, MAC address or other entity specific information available to other entities in which the entity credentials are to be shared.

The function f is likewise a symmetric cryptographic algorithm such as DES, 3DES, AES. However, a different symmetric cryptographic algorithm may be used from the one which generated the common secret $C_s$ 245. As described above, other common operations such as an exclusive OR operation or a concatenation operation may be substituted for or used in conjunction with the symmetric cryptographic algorithm.

While only one level of indirection is shown, one skilled in the art will appreciate that multiple levels of indirection may be provided for improving security or providing a secret hierarchy. A shared secret hierarchy may be established using an entity's specific secret $S_n$ 330 substituted for the common secret $C_s$ 245 for all subsequent entities in which a hierarchal arrangement is desired. In the hierarchal arrangement, the dependent entity specific secret is derived from a function having the general form of $$S_d = f(S_n, S_x)$$

where $S_n$ is a non-hierarchal entity secret common to all subsequent entities;

$S_x$ is an intermediate non-dependent entity secret of the intended hierarchal entity (corresponding to the specific string $E_n$); and;

$S_d$ is the final hierarchal entity secret derived from the combination of the non-hierarchal entity secret $S_n$ and the intermediate non-dependent entity secret $S_x$ using the general function f described above. In this embodiment of the invention, it will be necessary to consistently utilize the same function f throughout the derivation and entity secret regeneration process including the common secret $C_s$ 245.

In all cases, the common secret $C_s$ 245 and entity secret $S_n$ 330 should have sufficient bit strength to inhibit attempts at decoding the protected credentials. Minimum bit strength of 64-bits should be used and preferably a bit strength of 128 bits or greater where possible.

Figure 3A:
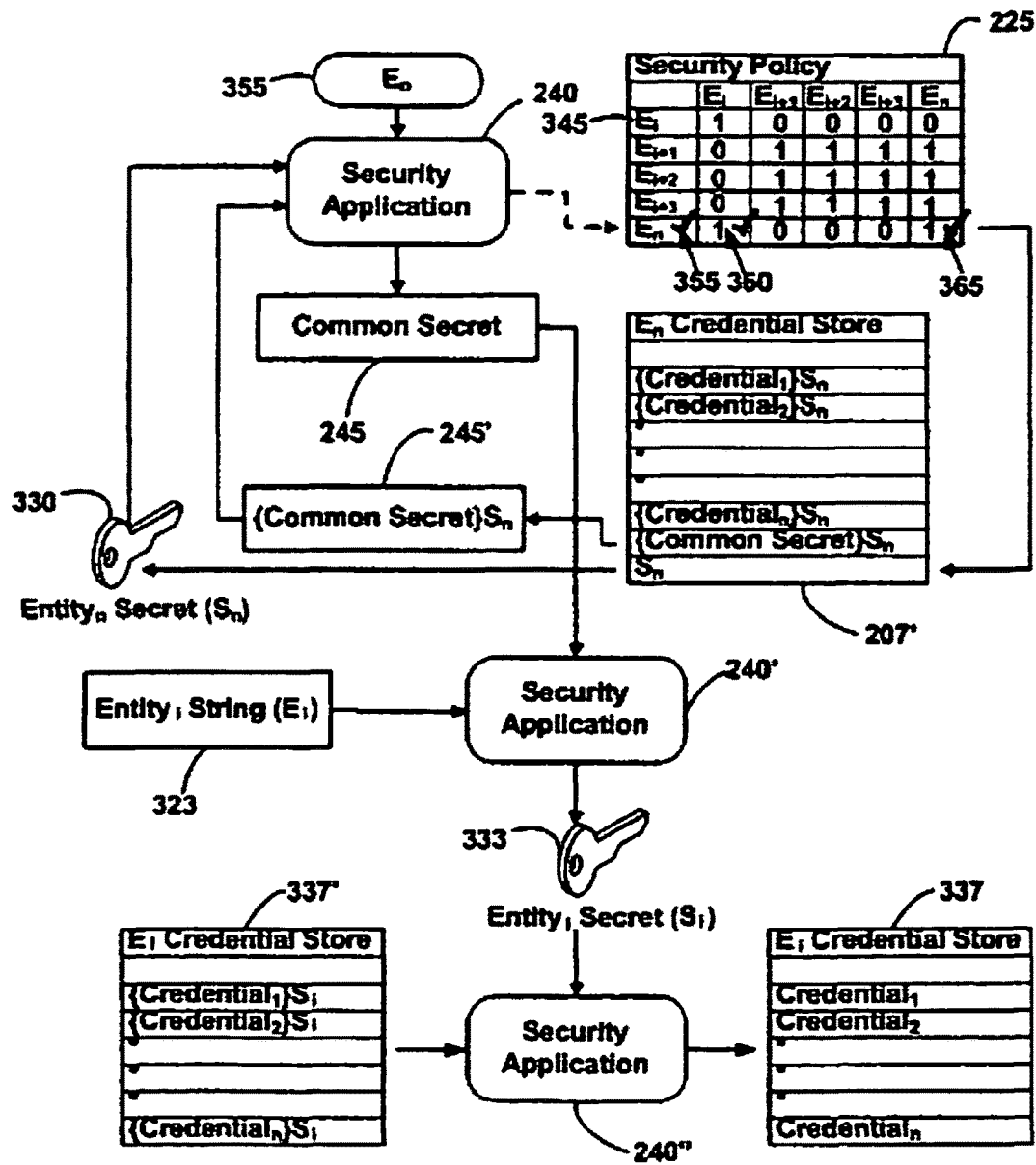
FIG. 3A—is an integrated detailed block diagram and flow chart depicting an implementation of an embodiment of the invention.

Referring to FIG. 3A, an example of a credential sharing session is depicted. In this continuing example from FIG. 3, entity $E_n$ 355 is attempting to share the credentials of entity $E_i$ 345. The security application 240 first verifies that entity $E_n$ 355 is authorized to share entity $E_i$ 345 credentials. The security application 240 locates entity $E_n$ 355 entry in the security policy and verifies that entity $E_n$ 355 is authorized to access entity $E_i$ 345 credentials 360 along with entity $E_n$ 355 own credentials 365.

Continuing, the security application 240 retrieves the encoded common secret 245' and entity $E_n$ secret 330. The encoded common secret 245' is then decoded by the security application 240 using entity $E_n$ secret 330. Entity $E_i$ unique string data 323 is retrieved from a public location such as the LDAP, file directory, an e-mail address book, URL or MAC address and combined algorithmically using the security application 240' which regenerates Entity $E_i$ secret 333. Entity $E_i$ secret 333 is then used to decode the Entity $E_i$ credential store 337' using security application 240" and allowing use of one or more of the decoded Entity $E_i$ credentials 337 by entity $E_n$ 355.

Various embodiments of the invention are disclosed hereinafter.

According to a first aspect the sharing arrangement between the first entity and the second entity is bi-directional. Not only does the second entity have access to some portion of the credentials of the first entity, but the first entity also has access to some portion of the credentials of the second entity. In this bi-directional sharing arrangement, the common secret between the first entity and the second entity can be used not only in the retrieval of the first secret by the second entity, but also in the retrieval of the second secret by the first entity. The functional relationship between the first secret and the second secret is therefore via the common secret.

According to an embodiment of the invention:
part of the first credentials are encrypted with a common secret,
part of the second credentials are encrypted with a common secret,
the common secret is further encrypted with the first string for retrieval by the second entity,
the common secret is further encrypted with the second string for retrieval by the first entity.

In a second aspect of the invention, the said first secret and said second secret incorporate a hierarchical structure such that said first secret may be used to derive said second secret but not visa versa. The said second secret is protected with said first secret.

In a third aspect of the invention, the first secret and said second secret incorporate a hierarchical structure such that said second secret may be used to derive said first secret but not visa versa. The first secret is protected with said second secret.

According to another embodiment:
part of the first credentials are protected with the first secret,
part of the second credentials are protected with the second secret,
the first secret is further protected with the second secret In the first aspect, the first secret and the second secret have functional parity. In the second aspect, the entity that can retrieve the second secret can access only part of the second credentials but the entity who can retrieve the first secret can access both part of the first credentials and part of the second credentials. In the third aspect, the entity that can retrieve the first secret can access only part of the first credentials but the entity who can retrieve the second secret can access both part of the first credentials and part of the second credentials.

Referring to FIG. 4, a block diagram illustrating a systematic embodiment of the invention is provided. In this embodiment of the invention, a network 65 enabled computer system 105 is shown having operatively installed therein at least one security application 240. The security application 240 is programmed to process sources of security information necessary for credential sharing including an operatively coupled credential datastore 207, a common secret 245, one or more retrievable entity strings 320 and a security policy 225.

In another embodiment of the invention, the security application is further programmed to process information utilizing an operatively coupled security token 90. In this embodiment of the invention, the security token 90 includes a local security application 310-T1, and optionally one or more credentials 207-T1, the common secret 245', one or more entity strings 320' and a separate security policy 225'. This embodiment of the invention allows the secure storage features available from the security token 90 to be utilized by the security application 240 by selectively maintaining one or more of the sources of security information necessary for credential sharing.

In yet another embodiment of the invention, the security application 240 is programmed to process the sources of security information necessary for credential sharing from the security token 90 alone. In this embodiment of the invention, the security token 90, the local security application 310-T1, the credential store 207-T1, the common secret 245', entity strings 320' and separate security policy 225' replace the credential store 207, common secret 245, entity strings 320 and a security policy 225 coupled to the security application 240.

Referring to FIG. 4A, a block diagram illustrating a systematic embodiment of the invention in an enterprise operating environment is provided. In this embodiment of the invention, a plurality of networked 65 enabled computer systems 105A, 105B are shown in processing communications with a security server S 105S.

Each of the computer systems 105A, 105B has operatively installed security applications 240A, 240B which are programmed to process sources of security information necessary for credential sharing. The sources of security information are distributed among a security application 240S installed on the security server S 105S and entity specific security tokens 90A, 90B operatively coupled to each security application 240A, 240B.

The security tokens 90A, 90B have operatively installed therein one or more credentials 207A, 207B which are controlled by local security applications 240AT, 240BT installed within the security tokens 90A, 90B.

The security application 240S is operatively installed in the security server 105S and is programmed to process sources of security information necessary for credential sharing from the security tokens 90A, 90B, and server maintained set of security policies 225, set of credentials, set of entity strings 320 and a common secret 245. This arrangement allows for credential sharing 207A, 207B, 207S among a plurality of networked client computer systems 105A, 105B, 105S while maintaining centralized control of credential sharing activities using the security server S 105S. Furthermore, in this embodiment of invention, the server version of the security application 240S performs the majority of the processing. The client and security token applications 240A, 240AT, 240B, 240BT provide the basic verification of an incoming request for credential sharing while the server S 105S performs the majority of the transport and security of credentials. Various sharing arrangements may be combined which incorporate elements obtained from the embodiments shown in FIGS. 3, 3A, 4 and/or 4A The common secret 245 and/or the credential store 207S may be stored inside a hardware security module (HSM) 90S or derived from a securely stored master secret contained inside the hardware security module (HSM) 90S. The hardware security module (HSM) 90S is an optional component to consider highly desirable for large enterprise deployment of the invention.

Figure 5:
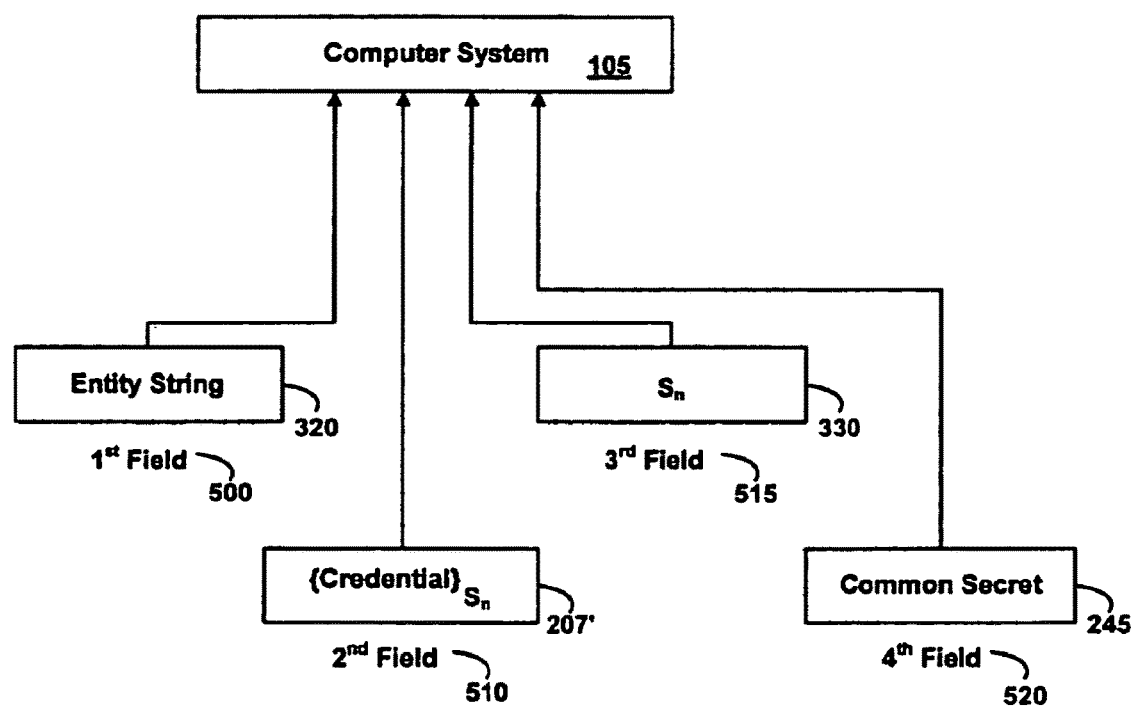
FIG. 5—is a detailed block diagram of a data structure arranged to implement an embodiment of the invention.

Referring to FIG. 5, a detailed block diagram is presented of a basic data structure embodiment of the invention. In this embodiment of the invention, a computer system 105, incorporates a data structure having a first data field 500 comprising entity string information 320, a second data field 510 comprising encoded credentials 207', a third data field 515 comprising an entity secret 330 utilized in encoding the credentials 207' of the second data field 510 and a forth data field 520 comprising a common secret 245 utilized in deriving the entity secret 330 of the third data field 515.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security system or financial services system. Other variations and embodiments are possible in light of above teachings, and it is not intended that this Detailed Description limit the scope of invention, but rather by the Claims following herein.

What is claimed:

1. A method to securely and selectively share at least a first entity credential stored in a first credential store among a plurality of separate entities including a first entity and a second entity, comprising:
   protecting at least a portion of the at least a first entity credential by encoding the at least a portion of the at least first entity credential using an algorithm which incorporates a first entity secret, including allowing the at least a portion of the first entity credential to be shared with at least the second entity;
   generating the first secret as a function of at least:
     i. a common secret between the first entity and at least the second entity, wherein the common secret is distinct from the at least first entity credential, and
     ii. a first entity specific string retrievable by at least the second entity; and
   responsive to at least the first secret, granting at least the second entity permission to share at least the portion of the first entity credential, wherein the second entity is provided with access rights of the first entity corresponding to the first entity credential that is shared with the second entity.

2. The method according to claim 1, wherein the sharing of the at least a portion of the first entity credential is revocable.

3. The method according to claim 2, wherein the protecting at least a portion of the first entity credential includes providing a security table that allows at least the portion of the first entity credential to be revocably shared with at least the second entity.

4. The method according to claim 3, wherein the security table includes credential sharing expiration dates.

5. The method according to claim 3, wherein the security table includes location usage rules.

6. The method according to claim 3, wherein the security table includes priority usage rules.

7. The method according to claim 3, wherein the security table includes time usage rules.

8. The method according to claim 3, wherein the security table includes security state-based rules.

9. The method according to claim 1, wherein the generating the first secret includes combining the first entity specific string with the common secret.

10. A non-transitory computer readable medium having software stored thereon that securely and selectively shares at least a first entity credential among a plurality of separate entities including a first entity and a second entity, the software comprising:
  executable code that protects at least a portion of the at least first entity credential by encoding the at least portion of the at least first entity credential using an algorithm which incorporates a first entity secret, including allowing the at least portion of the first entity credential to be shared with at least the second entity;
  executable code that generates the first secret as a function of at least:
    a common secret between the first entity and at least the second entity wherein the common secret is distinct from the at least first entity credential, and
    a first entity specific string retrievable by the at least the second entity; and
  executable code that, responsive to at least the first secret, grants at least the second entity permission to share the at least portion of the first entity credential, wherein the second entity is provided with access rights of the first entity corresponding to the first entity credential that is shared with the second entity.

11. The non-transitory computer readable medium according to claim 10, wherein the sharing of the at least portion of the first entity credential is revocable.

12. The non-transitory computer readable medium according to claim 10, wherein protecting at least a portion of the first entity credential includes providing a security table that allows at least a portion of the first entity credential to be revocably shared with at least the second entity.

13. The non-transitory computer readable medium according to claim 12, wherein the security table includes credential sharing expiration dates.

14. The non-transitory computer readable medium according to claim 12, wherein the security table includes location usage rules.

15. The non-transitory computer readable medium according to claim 12, wherein the security table includes priority usage rules.

16. The non-transitory computer readable medium according to claim 12, wherein the security table includes time usage rules.

17. The non-transitory computer readable medium according to claim 12, wherein the security table includes security state-based rules.

18. The non-transitory computer readable medium according to claim 10, wherein the executable code that generates the first secret includes executable code that combines the first entity specific string with the common secret.

* * * * *